United States Patent
Knox et al.

[11] Patent Number: 5,864,370
[45] Date of Patent: Jan. 26, 1999

[54] DISPLAY APPARATUS WITH GAMMA CORRECTION

[75] Inventors: Andrew Knox, Kilbirnie; John Beeteson, Skelmorlie, both of United Kingdom

[73] Assignee: International Business Machines Corporation, Armonk, N.Y.

[21] Appl. No.: 631,276

[22] Filed: Apr. 12, 1996

[30] Foreign Application Priority Data

Sep. 22, 1995 [GB] United Kingdom .................. 9519417

[51] Int. Cl.$^6$ ..................................................... H04N 7/73
[52] U.S. Cl. ............................................ 348/674; 348/675
[58] Field of Search .................................. 348/254–256, 348/674–677, 181–192; 358/519; H04N 5/202

[56] References Cited

U.S. PATENT DOCUMENTS

| | | | |
|---|---|---|---|
| 5,315,378 | 5/1994 | Satou et al. ........................ | 348/181 X |
| 5,510,851 | 4/1996 | Foley et al. ........................ | 348/189 X |
| 5,526,058 | 6/1996 | Sano et al. ........................ | 348/675 |
| 5,532,765 | 7/1996 | Inoue et al. ........................ | 348/180 X |
| 5,671,021 | 9/1997 | Kumada et al. ........................ | 348/644 |

*Primary Examiner*—Nathan Flynn
*Attorney, Agent, or Firm*—Scully, Scott, Murphy & Presser; Jay P. Sbrollini, Esq.

[57] ABSTRACT

Display apparatus comprises a display screen. Drive means generates an image on the display screen in response to a video signal input from an external video source. The drive means comprises a memory for storing a gamma value and gamma correction means for modifying the input video signal as a function of a gamma value. Gamma variation means permits adjustment or the gamma value stored in the memory in response to a control signal input.

14 Claims, 6 Drawing Sheets

DISPLAY APPARATUS WITH GAMMA CORRECTION

The present invention relates to display apparatus with gamma correction.

In a conventional cathode ray tube (CRT), there is typically an exponential relationship between electron beam current and drive voltage applied to the electron gun producing the beam. The exponent is usually referred to as the gamma (Y) of the CRT. Gamma correction is a term which is generally employed to describe the non-linear amplification of input video signals to produce linear visual output. The transfer function of a CRT can be expressed as $V_{out} = V_{in}^Y$, where $V_{out}$ is representative of the beam current; $V_{in}$ is representative of the input video signal voltage level; and Y is, as already mentioned, the gamma of the CRT. For a typical CRT, Y is between 2.2 and 2.8. The Y for each and every CRT is different. These differences manifest themselves as difference in available contrast ratio. Even relatively small difference of 0.2 or less are easily distinguished. The Y function stems from the geometry of the triode section of the electron gun of the CRT, including electrode spacings and material thicknesses. It will hence be appreciated that Y is sensitive to production tolerances. Y also changes with CRT life as the CRT cathode to grid 1 spacing increases due to evaporation of cathode material.

Conventionally, it was general practice to assume that all CRTs of a particular type had the same Y of, for example, 2.7. A video signal source for driving monitor including a CRT was then pre-distorted by the reciprocal of the Y of the CRT (eg: $2.7^{-1}=0.371$). Thus when information is presented to a user by the monitor, there was a linear relationship apparent between light output from the monitor and input video signal. A problem with this approach is that it does not compensate for changes in Y as the CRT ages. Another problem is that the tolerance limits relating to Y are such that two apparently identical CRTs can have significantly different Y values.

In accordance with the present invention, there is now provided display apparatus comprising a display screen, and drive means for generating an image on the display screen in response to a video signal input from an external video source, characterised in that the drive means comprises a memory for storing a gamma value, gamma correction means for modifying the input video signal as a function of the gamma value; and gamma variation means for adjusting the gamma value stored in the memory in response to a control signal input.

This advantageously permits adjustment of CRT gamma compensation so that the display apparatus maintains a constant Y despite CRT aging effects during its operational life.

Preferably, the gamma variation means comprises a data link for connection to the external video source for receiving the control signal input from the video source.

The gamma variation means may comprise a manually operable user control for generating the control signal input.

In a preferred embodiment of the present invention, the gamma correction means comprises a logarithmic amplifier having an input arranged to receive the input video signal, a linear amplifier having an input connected to the output of the logarithmic amplifier, and an anti-logarithmic amplifier connected to the output of the linear amplifier; and wherein the gamma variation means comprises programmable gain control means connected to the linear amplifier.

The programmable gain control means preferably comprises a programmable potentiometer.

In preferred embodiments of the present invention, the drive means comprises gamma measurement means having a test signal generator for generating a test signal to produce a test image on the display screen, and output detection means generating a sense signal as a function of the test image produced on the display screen.

The test signal generated by the test signal generator may comprise a staircase waveform, the sense signal comprises a series of sense values each corresponding to a different step value of the staircase waveform.

In preferred embodiments of the present invention, there is provided communication means for sending the sense values and the corresponding step values to the video source via a data link.

Preferably, the drive moans comprises processing means for generating the gamma value of the display apparatus as a function of the step values and the corresponding sense values.

The processing means preferably comprises means for determining logarithms of the sense values to produce log sense values, means for determining logarithms of the steps of the staircase waveform to produce log step values corresponding to the log sense values, and means for determining the gradient of a graph relating the log sense values to the log step values to determine the gamma value.

The processing means may comprise data communication means for sending the gamma value to the video source via a data link.

In some embodiments of the present invention, processing means may determine the gamma value in response to a command issued by the video source via the data link.

The output detection means may comprise a photo-detector for generating the sense signal in response to light output from the display screen. Alternatively, the output detection means comprises a current sensor for generating the sense signal in response to an electron beam current flowing in the display screen. The output detection means preferably comprises an analogue to digital convertor for digitising the sense signal for processing by the processing means.

It will be appreciated that the present invention extends to a computer system comprising data storage means, a processor for processing data stored in the data storage means, a video source for generating a video signal as a function of data processed by the processor, data input means for receiving data from external sources and, display apparatus as hereinbefore described connected to the video source for generating an image as a function of the video signal.

Preferred embodiments of the present invention will now be described, by way of example only, with reference to the accompanying drawings in which.

Figure 1:
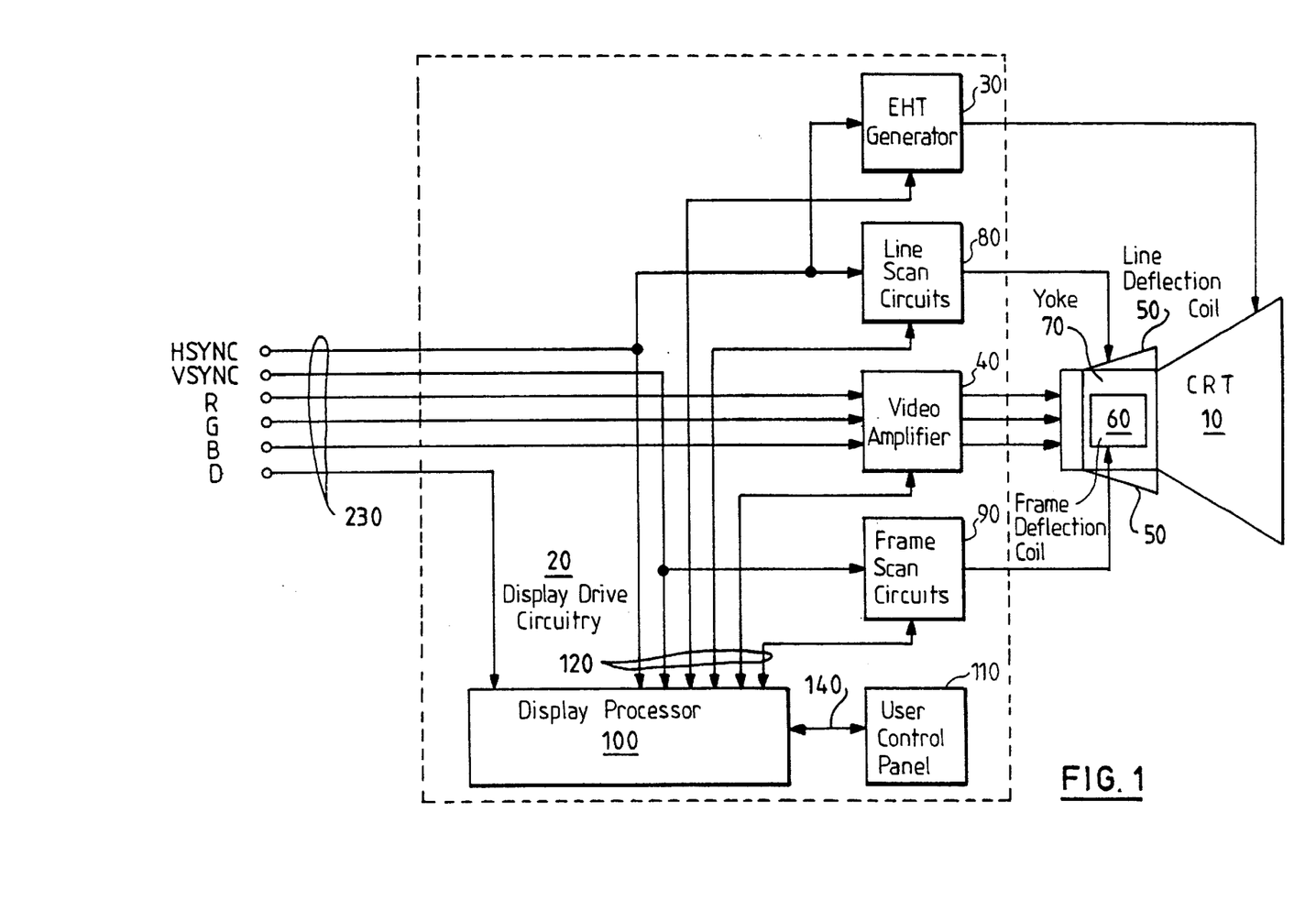
FIG. 1 is a block diagram of display apparatus embodying the present invention.

Referring first a FIG. 1, a CRT display comprises a colour cathode ray display tube (CRT) display screen 10.

CRT 10 is connected to display drive circuitry 20. Display drive circuitry 20 comprises an Extra High Tension (EHT) generator 30 and a video amplifier 40 connected to display screen 10. Line and frame deflection coils 50 and 60 are disposed around the neck of the CRT on a yoke 70. Deflection coils 50 and 60 are connected to line and frame scan circuits 80 and 90 respectively. Line scan circuit 80 and EHT generator 30 may each be in the form of a flyback circuit, the operation of which is well known by those skilled in the art. Furthermore, as is also well-known in the art, EHT generator 30 and line scan circuit 80 may be integrated in a single flyback circuit. A power supply (not shown) is connected via power supply rails (not shown) to EHT generator 30, video amplifier 40, and line and frame scan circuits 80 and 90. In use, the power supply provides electrical power on the supply rails from Line and Neutral connections (not shown) to the domestic electricity mains supply. The power supply may be in the form of a switch mode power supply, the operation of which is well-understood by those skilled in the art.

EHT generator 30, video amplifier 40, and line and frame scan circuits 80 and 90 are each connected to a display processor 100. Display processor 100 includes a microprocessor. A user control panel 110 is provided on the front of the display device. Control panel 110 includes a plurality of manual operable switches. User control panel is connected to key-pad interrupt lines of processor 100.

In operation, EHT generator 30 generates an electric field within CRT 10 for accelerating electrons in beams corresponding to the primary colours of red, green and blue towards the screen of CRT 10. Line and frame scan circuits 80 and 90 generate line and frame scan currents in deflection coils 50 and 60. The line and frame scan currents are in the form of ramp signals to produce time-varying magnetic fields that scan the electron beams across the screen of CRT 10 in a raster pattern. The line and frame scan signals are synchronised by line and frame scan circuits 80 and 90 to input line and frame synchronisation (sync) signals HSYNC and VSYNC generated by a video source such as a personal computer system unit, for example. Video amplifier 40 modulates the red, green and blue electron beams to produce an output display on CRT 10 as a function of corresponding red, green and blue input video signals R, G and B also generated by the video source. Sync signals HSYNC and VSYNC and video signals R, G and B are supplied from the video source to the display apparatus via an interface cable 230. Interface cable 230 also carries a data link D, such a VESA DDC link, between the video source and the display apparatus. Data link D is coupled to processor 100. In operation, data such as control data, test data and the like can be exchanged between processor 100 and the video source via link D. In some embodiments of the present invention, data link D comprises a serial data link. However, it will be appreciated that, in other embodiments of the present invention, data link D may comprise a parallel data link. It will also be appreciated that, while in some embodiments of the present invention, data link D may be integral to interface cable 230, in other embodiment of the present invention, data link D may be external from interface cable 230.

Display processor 100 is configured to control the outputs of EHT generator 30, video amplifier 40, and line and frame scan circuits 80 and 90 via control links 120 as functions of preprogrammed display mode data and inputs from user control 110. The display mode data includes sets of preset image parameter values each corresponding to a different popular display mode such as, for example, 1024× 768 pixels, 640×480 pixels, or 1280×1024 pixels. Each set of image display parameter values includes height and centring values for setting the output of frame scan circuit 90; and width and centring values for controlling line scan circuit 80. In addition, the display mode data includes common preset image parameter values for controlling the gain and cut-off of each of the red, green and blue channels of video amplifier 40; and preset control values for controlling the outputs of EHT generator 30. The image parameter values are selected by display processor 100 in response to mode information from the video source. Display processor 100 processes the selected image parameter values to generate analog control levels on the control links.

A user can manually adjust, via user control 110, control levels sent from display processor 100 to drive circuitry 20 to adjust the geometry of the displayed picture according to personal preference. User control panel 110 includes a set of up/down control keys for each of image height, centring, width, brightness and contrast. Each of the keys controls, via display processor 100, a different one or combination of the control levels, such as those controlling red green and blue video gains and cutoffs at video amplifier 40; and those controlling image width, height, and centring at line and frame scan circuits 80 and 90.

The control keys are preferably in the form of pushbuttons connected to key-pad interrupt inputs 130 to display processor 100. When, for example, the width up key is depressed, user control panel 110 issues a corresponding interrupt to display processor 100. The source of the interrupt is determined by display processor 100 via an interrupt polling routine. In response to the interrupt from the width key, display processor 100 progressively increases the corresponding analog control level sent to line scan circuit 80. The width of the image progressively increases. When the desired width is reached, the user releases the key. The removal of the interrupt is detected by display processor 100, and the digital value setting the width control level is retained. The height, centring, brightness and contrast setting can be adjusted by the user in similar fashion. User control panel 110 preferably further includes a store key. When the user depresses the store key, an interrupt is produced to which display processor 100 responds by storing in memory parameter values corresponding the current settings of the digital outputs to D to A convertor as a preferred display format. The user can thus programme into the display specific display image parameters according to personal preference. It will be appreciated that, in other embodiments of the present invention, user control panel 110 may be provided in the form of an on-screen menu. It will also be appreciated that, in some embodiments of the present invention, the users personal preferences may be automatically saved by processor 100 after a predetermined time interval (a 5 second delay, for example).

Figure 2:
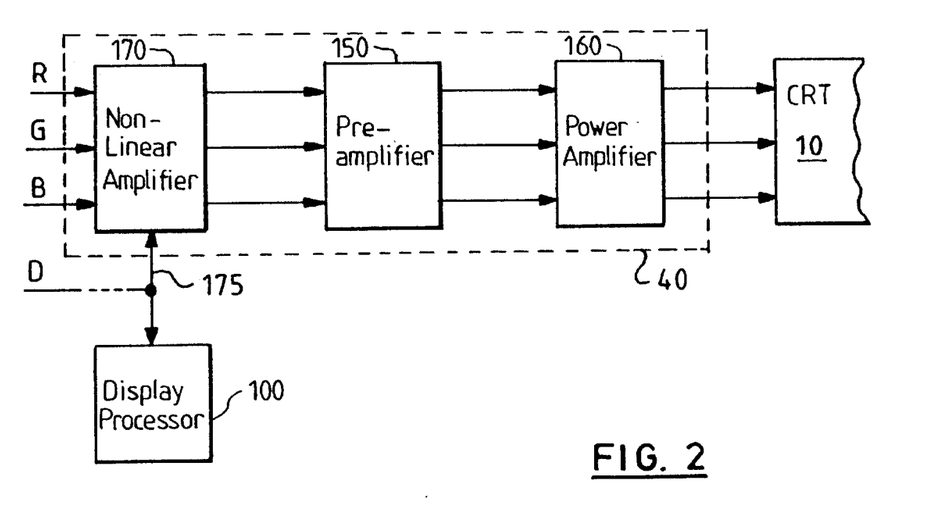
FIG. 2 is a block diagram of a video amplifier of display apparatus embodying the present invention.

Turning now to FIG. 2, video amplifier 40 comprises a video preamplifier having R, G and B channels. The outputs of the R, G and B channels are coupled, via corresponding power amplifiers 160, to corresponding cathodes of CRT 10. A nonlinear amplifier 170 is connected to preamplifier 150. Amplifier 170 has R, G and B channels each having an input connected to a corresponding one to the R, G and B video signals input to the display apparatus from the video source. The output or the R, G and B channels of amplifier 170 are connected to lie inputs of the corresponding R, G and B channels of preamplifier 150. Amplifier 170 has a digital control input connected to processor 100.

In operation, each channel of amplifier 170 amplifies the corresponding video signal according to a non-linear transfer function to be described shortly. The outputs of amplifier 170 are then amplified, in turn, by preamplifier 150 and power amplifier 160 before application to the corresponding cathodes of CRT 10.

Figure 3:
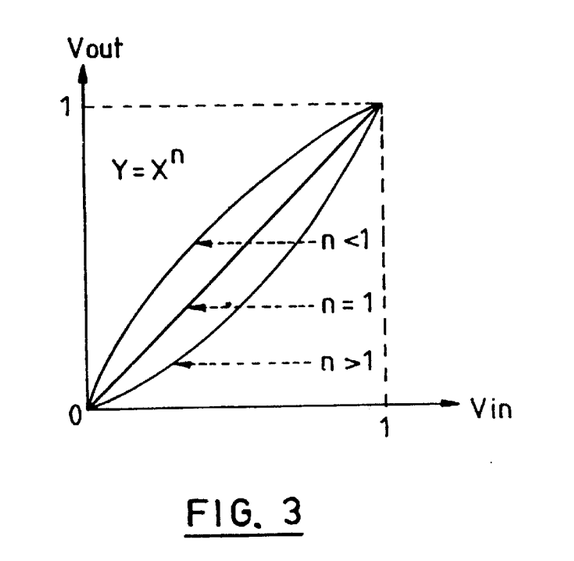
FIG. 3 is a graph of a video transfer function of the display apparatus.

Referring now to FIG. 3, each channel of non-linear amplifier 170 has a transfer function $V_{out}=V_{in}^Y$ which is variable between Y<1 and Y>1 about an ideal linear characteristic at Y=1. The transfer function is applied by each channel of amplifier 170 to the corresponding video signal on a pixel by pixel basis. Each incoming pixel amplitude dictates the correction level applied according to the transfer function.

Figure 4:
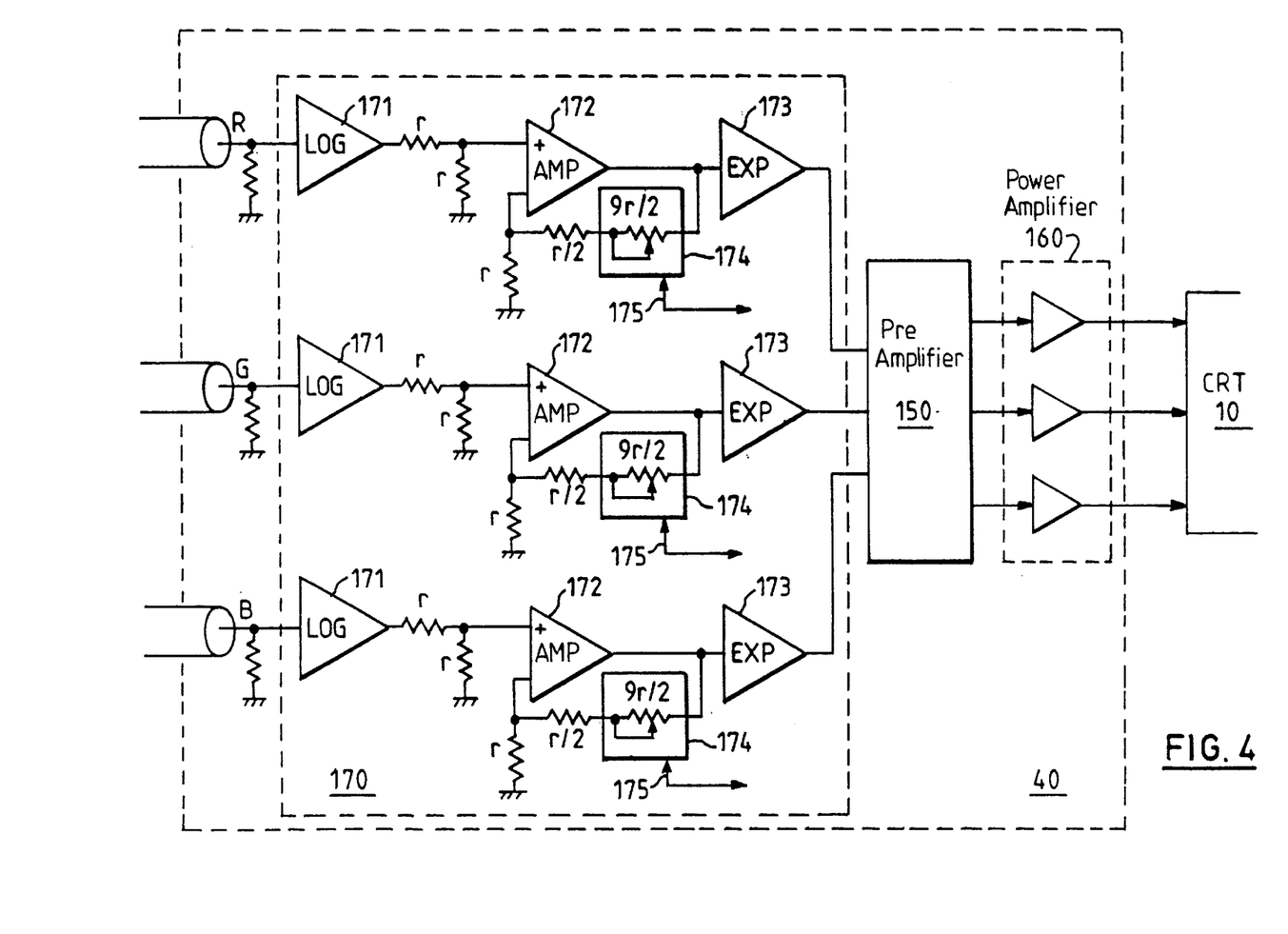
FIG. 4 is a detailed block diagram of an example of the video amplifier of FIG. 2.

Turning now to FIG. 4, a preferred embodiment of the present invention stems from a realisation that $X^n = \exp[n \log_e(X)]$. Accordingly, in that embodiment, each of the R, G and B channels of amplifier 170 comprises a logarithmic amplifier 171 having an input connected to receive the corresponding video signal from the video source. The output of amplifier 171 is connected to the input of a variable gain noninverting amplifier 172. The output of amplifier 172 is connected to the input of an anti-logarithmic amplifier 173. The output of amplifier 173 is connected to the corresponding input of preamplifier 150.

In operation, linear amplifier 172 sets the power Y in the transfer function $V_{out}=V_{in}^Y$. The gain of amplifier 172 is variable between 0.75 and 3. Such variation may be achieved in the FIG. 4 embodiment by the resistor ratios depicted therein. It will be appreciated that gains of <1 are desirable to permit the amplifier to correct for overcompensated Y in the video signals provided by the video source (eg: if the video source expects the display apparatus Y to be 2.7 whereas the display apparatus Y is only 2.4).

As mentioned in the introduction, conventional computer system graphics adaptors usually pre-distort the output video signals based on an assumed monitor Y. The arrangements of FIG. 2 and 4 avoid any need for such pre-distortion. The arrangement of FIGS. 2 and 4 are particularly although not exclusively useful where the video source is a computer system having both a graphics adaptor and a television receiver card fitted.

Returning again to FIG. 4, linear amplifier 173 comprises a feedback loop which includes a electrically programmable potentiometer or "E²POT" 174 to provide variable gain. Potentiometer 174 has a digital control input connected to processor 100 via a control bus 175 such as an I²C control bus. Control bus 175 permits processor 100 to set the gains of amplifier 173 in each channel of non-linear amplifier 170 via potentiometer 174. Referring back to FIG. 2, in particularly preferred embodiments of the present invention, control bus 175 is coupled to link D. Link D permits a desired Y to be set in the display apparatus by a remote video source such as a personal computer system unit.

Although a preferred example of non-linear amplifier 170 has been described with reference to FIG. 4, it should be appreciated that non-linear amplifier 170 may be realised in many different ways. In other embodiments of the present invention for example, amplifier 170 may be implemented by analogue multipliers. Multipliers advantageously have bandwidths extending to many 100's of MHz thereby permitting passage of very high frequency video signals without degradation. An example of such a multiplier is the MPY600 100 MHz four quadrant multiplier available from Burr Brown. However, reference to FIG. 2 will indicate that the desired transfer function is a single quadrant operation. Hence, the arrangement of FIG. 4 may provide a more cost-effective solution. It will be appreciated from FIG. 4 that the amplifier 170 may easily be integrated into a single application specific integrated circuit for ease of manufactures. It will also be appreciated that amplifier 170 may be integrated with preamplifier 150 into a single integrated circuit.

Figure 5:
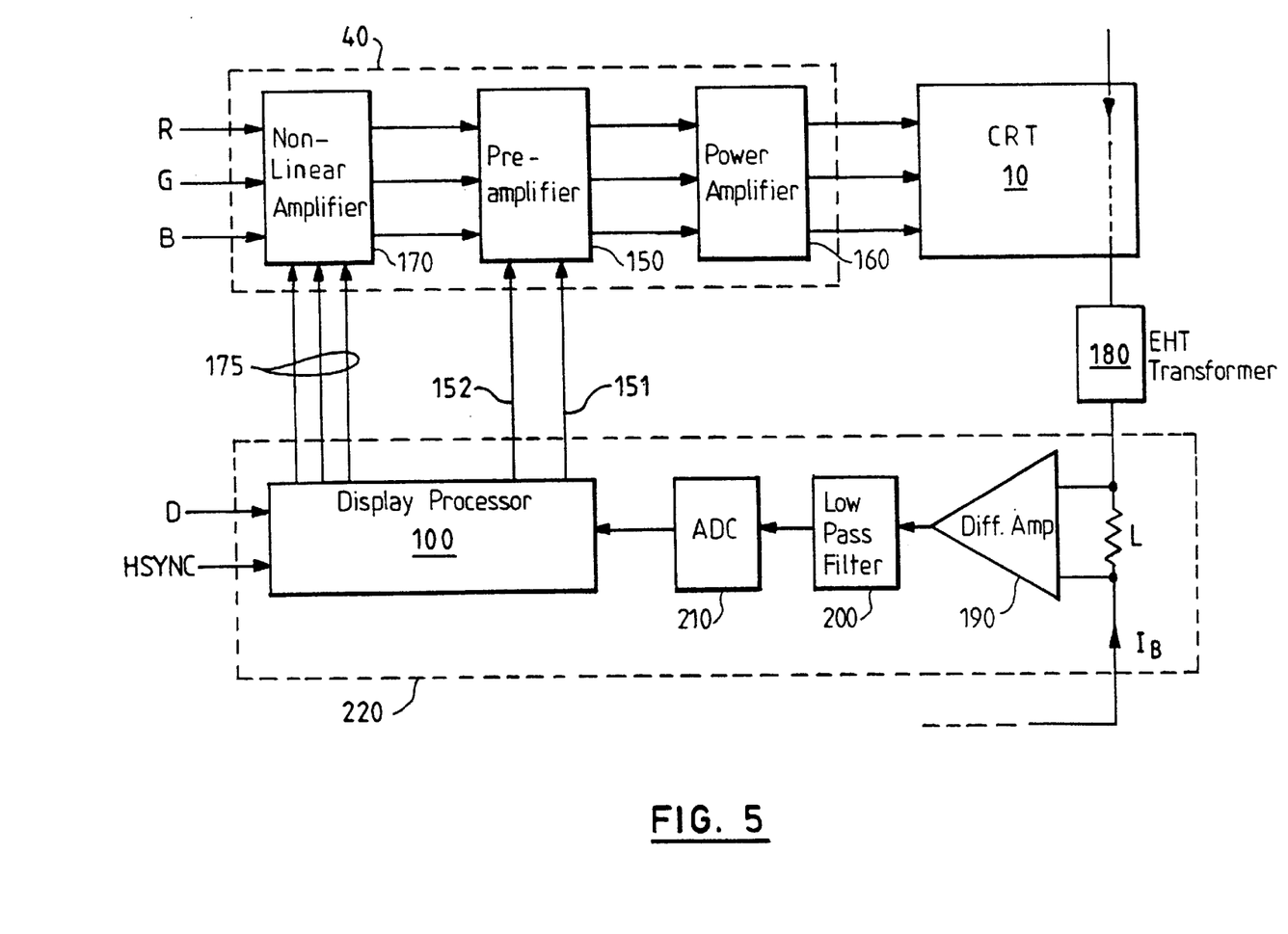
FIG. 5 is a block diagram of a video sub-system of display apparatus embodying the present invention.

Referring now to FIG. 5, a particularly preferred example of display apparatus of the present invention comprises measurement means 220 for measuring its own Y. Measurement means comprises a current sense resistor connected to an EHT transformer 180 of EHT generator 30. A differential amplifier 190 has a pair of inputs each of which is connected to an opposite end of the resistor. The output of amplifier 190 is connected to the input of a low pass filter 200. The output of filter 200 is connected to the input of an analogue to digital convertor (ADC) 210. The output of ADC 210 is connected to processor 100. Processor 100 has a gain output 152 and a test signal output 151 connected to preamplifier 150 of video amplifier 40.

In operation, processor 100 is configured to permit the display apparatus to be selectively switched between a normal mode of operation and a test mode of operation.

During normal operation as discussed briefly earlier, R, G, and B video signals from a video source such a computer system unit enter the display apparatus. The video signals are amplified and inverted by video amplifier 40. The outputs of amplifier 40 drive the cathodes of CRT 10. Electron beam current flows in CRT 10 as a function of the input voltage drive levels applied to the cathodes and image brightness and contrast settings.

During test operation the incoming video signals are routed away from video amplifier 40. Instead processor 100 provides a set of video signals to video amplifier 40 via test lines 151 to preamplifier 150. In some embodiments of the present invention, test mode operation may be invoked by leaving interface cable 230 unattached to the video source. In other embodiments of the present invention, the video source may remain attached to interface cable 230 to provide line and frame sync signals to the display apparatus.

Figure 6:
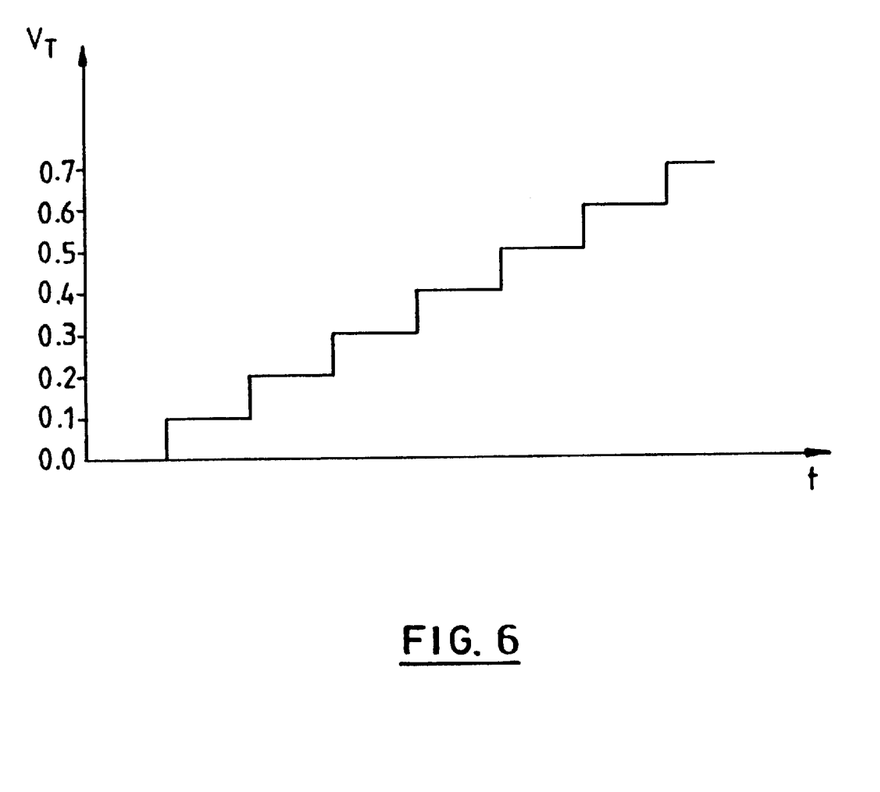
FIG. 6 is a waveform diagram of a video test signal for the video sub-system of FIG. 5.

Referring now to FIG. 6, an example of a test signal $V_T$ for supply to preamplifier 150 during test mode operation comprises a staircase waveform. The waveform is preferably the same for each of the red, green and blue channels of video amplifier 40.

It should be appreciated that the present invention is however applicable to both colour and monochrome displays. In the following, operation of measurement means 220 is described in connection with a monochrome display for simplicity of explanation. Reference is however made to FIGS. 1 and 2 to assist in the explanation although it will be appreciated that, in a monochrome display, there is only one input video signal rather than three. Initially, the first voltage level ($V_-=0.1V$) of the staircase waveform test signal drives preamplifier 150 and power amplifier 160 of video amplifier 40. Processor 100 sets a desired contrast level in preamplifier 150 via gain control line 152. In practice, an absolute value for the desired contrast level is not important provided that the value remains constant for the duration of the measurement. Beam current $I_B$ flows in response to the drive voltage applied to the cathode. $I_B$ is detected in the form of a potential difference across sense resistor L. The potential difference is amplified by differential amplifier 190. The output of amplifier 190 is filtered by low pass filter 200 to removed unwanted noise and any switching transients introduced by, for example, EHT generator 30 and/or horizontal deflection circuit 80. The output of the filter 200 is quantised by ADC 210 to produce a digital value. The digital value is stored by processor 100 in association with the test video input drive level $V_T$. The above process is then repeated a desired number of times, increasing the test video input drive level $V_T$ by another step in the staircase waveform each time. For example, in the example waveform of FIG. 6, there are 7 steps, although it will be appreciated that in other embodiments of the present invention, there may be greater than or fewer than 7 steps. Processor 100 builds a table of values of beam current $I_B$ against input video signal level $V_T$. An algorithm is then executed by processor 100 to determine the Y of the display apparatus from the stored values of $I_B$ and the corresponding input video levels $V_T$. An example of such an algorithm for calculating Y comprises taking logarithms of $I_B$ and $V_T$ and performing a curve fit to the relationship of $\log(I_B)$ to $\log(V_T)$. The slope of $\log(I_B)$ over $\log(V_T)$ then provides processor 100 with Y.

It should be appreciated that, for colour display apparatus, Y may not change significantly between the Red, Green, and Blue channels. However, it will be appreciated that examples of colour display apparatus embodying the present invention as hereinbefore described may be configured to test each video channel and calculate the individual Y associated to each of them.

Figure 7:
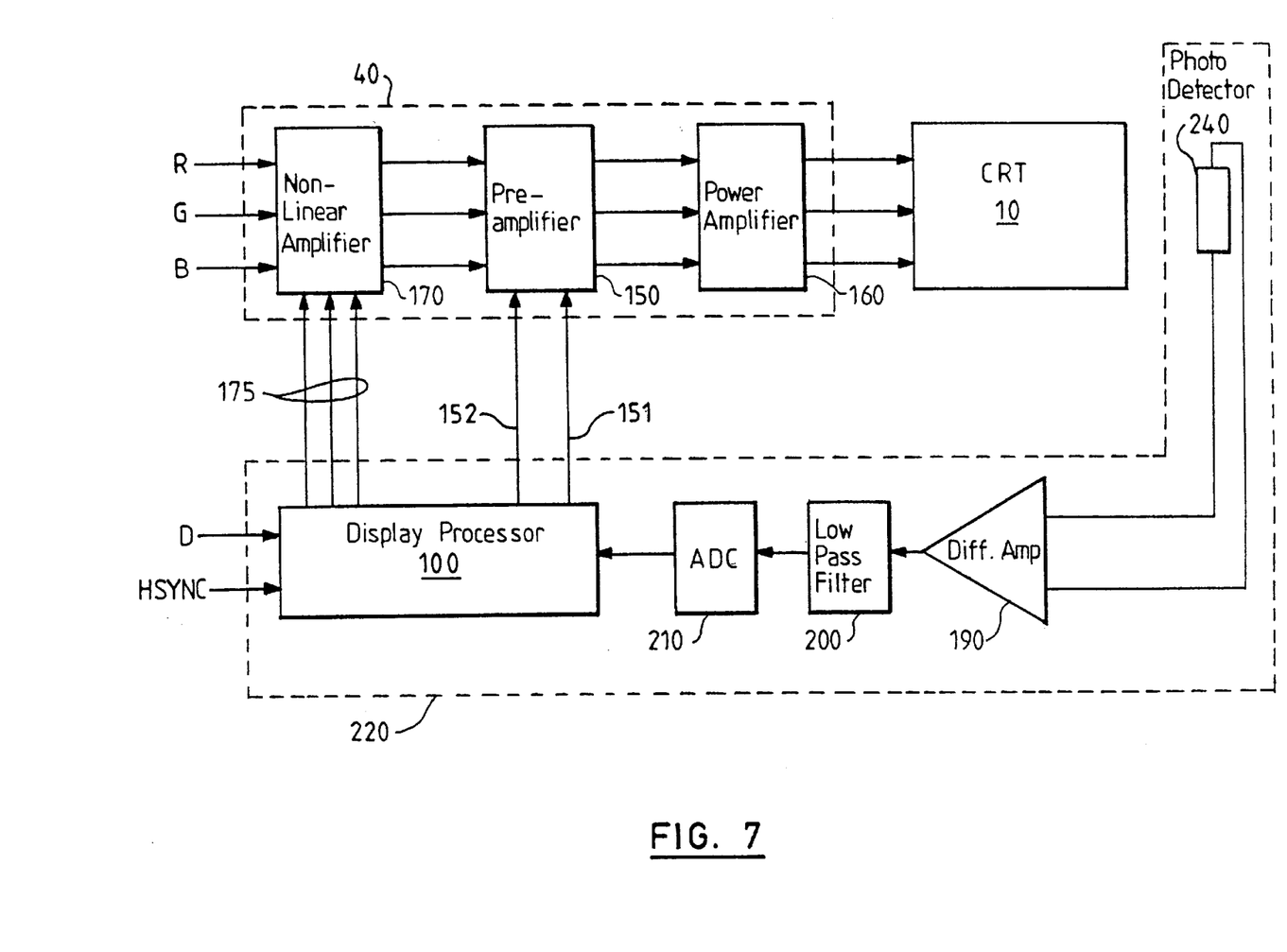
FIG. 7 is a block diagram of another video sub-system of display apparatus embodying the present invention.

Referring now to FIG. 7, in a modification to the embodiment of the present invention depicted in FIG. 5, the inputs to amplifier are connected to a photo-detector 240. Detector 240 is positioned in the display apparatus to detect light output from CRT 10. In operation, detector 240 generates an output voltage signal as a function of light output from CRT 10, and hence beam current flowing in CRT 10. It will be appreciated therefore that the output of detector 240 is equivalent to the potential difference detected across sense resistor L in the FIG. 5 arrangement. It will also be appreciated However that stray light entering the detector 240 and non-linearities in the performance of the detector 240 may complicate the aforementioned processing of data recorded from ADC 210 by processor 100.

Processor 100 can report the calculated Y to the video source via link D. This permits the video source to automatically adjust its Y correction factor to suit the display apparatus, thereby optimising colour rendering and contrast range.

In a preferred embodiment of the present invention hereinbefore described, Y was calculated within the display apparatus by processor 100 based on a table of values of $V_T$ and $I_B$. It will however now be appreciated that, in other embodiments of the present invention, Y may be calculated remotely by the video source based on values of $V_T$ and $I_B$ sent to video source by the display apparatus via data link D.

It will be appreciated that, in some embodiments of the present invention, measurement means 220 may permit the display apparatus to report the measured Y to the video source via data link D. Equally, in some embodiment of the present invention, the video source may change the Y value stored in the display apparatus via data link D. Furthermore, in some embodiments of the present invention, measurement means 220 may permit the Y value stored in the to corrected within the display apparatus independently of the video source. The corrected value may then be reported back to the video source via data link D.

We claim:

1. A display apparatus comprising:
    a display screen and drive means for generating an image on the display screen in response to a video signal input from an external video source, the drive means comprising:
        a memory for storing a gamma value,
        gamma correction means for modifying the input video signal as a function of the gamma value,
        gamma variation means for adjusting the gamma value stored in the memory in response to a control signal input,
        gamma measurement means having a test signal generator for generating a test signal to produce a test image on the display screen,
        output detection means generating a sense signal as a function of the test image produced on the display screen, and
        processing means for generating the gamma value of the display apparatus as a function of the step values and the corresponding sense values, wherein the processing means comprises means for determining logarithms of the sense values to produce log sense values, means for determining logarithms of the steps of the staircase waveform to produce log step values corresponding to the log sense values, and means for determining the gradient of a graph relating the log sense values to the log step values to determine the gamma value.

2. The display apparatus as claimed in claim 1, wherein the gamma variation means comprises a data link for connection to the external video source for receiving the control signal input from the video source.

3. The display apparatus as claimed in claim 1, wherein the gamma variation means comprises a manually operable user control for generating the control signal input.

4. The display apparatus as claimed in claim 1, wherein the gamma correction means comprises a logarithmic amplifier having an input arranged to receive the input video signal, a linear amplifier having an input connected to the output of the logarithmic amplifier, and an anti-logarithmic amplifier connected to the output of the linear amplifier; and wherein the gamma variation means comprises programmable gain control means connected to the linear amplifier.

5. The display apparatus as claimed in claim 4, wherein the programmable gain control means comprises a programmable potentiometer.

6. The display apparatus as claimed in claim 1, wherein the test signal generated by the test signal generator comprises a staircase waveform, the sense signal comprises a series of sense values each corresponding to a different step value of the staircase waveform.

7. The display apparatus as claimed in claim 1, comprising communication means for sending the sense values and the corresponding step values to the video source via a data link.

8. The display apparatus as claimed in claim 1, wherein the processing means comprising data communication means for sending the gamma value to the video source via a data link.

9. The display apparatus as claimed in claim 8, wherein the processing means obtains the gamma value in response to a command issued by the video source via the data link.

10. The display apparatus as claimed in claim 1, wherein the output detection means comprises a photo-detector for generating the sense signal in response to light output from the display screen.

11. The display apparatus as claimed in claim 10, comprising an analogue to digital convertor for digitising the sense signal for processing by the processing means.

12. A computer system comprising data storage means, a processor for processing data stored in the data storage means, a video source for generating a video signal as a function of data processed by the processor, data input means for receiving data from external sources and, display apparatus as claimed in claim 1 connected to the video source for generating an image as a function of the video signal.

13. A display comprising:
  a display screen and drive means for generating an image on the display screen in response to a video signal input from an external video source, the drive means comprising:
  a memory for storing a gamma value,
  gamma correction means for modifying the input video signal as a function of the gamma value,
  gamma variation means for adjusting the gamma value stored in the memory in response to a control signal input,
  gamma measurement means having a test signal generator for generating a test signal to produce a test image on the display screen, and
  output detection means generating a sense signal as a function of the test image produced on the display screen, wherein the output detection means comprises a current sensor for generating the sense signal in response to an electron beam current flowing in the display screen.

14. The display apparatus as claimed in claim 13, comprising an analogue to digital convertor for digitizing the sense signal for processing by the processing means.

* * * * *